US007996400B2

(12) United States Patent
Morris et al.

(10) Patent No.: US 7,996,400 B2
(45) Date of Patent: Aug. 9, 2011

(54) IDENTIFICATION AND USE OF WEB SEARCHER EXPERTISE

(75) Inventors: Daniel Scott Morris, Bellevue, WA (US); Ryen William White, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 295 days.

(21) Appl. No.: 11/767,489

(22) Filed: Jun. 23, 2007

(65) Prior Publication Data

US 2008/0319976 A1 Dec. 25, 2008

(51) Int. Cl.
*G06F 7/00* (2006.01)
*G06F 17/30* (2006.01)
(52) U.S. Cl. ........................................................ 707/732
(58) Field of Classification Search .................. 707/3, 5, 707/732
See application file for complete search history.

(56) References Cited

U.S. PATENT DOCUMENTS

| 5,724,521 | A | * | 3/1998 | Dedrick | 705/26 |
|---|---|---|---|---|---|
| 6,021,403 | A | * | 2/2000 | Horvitz et al. | 706/45 |
| 6,327,590 | B1 | | 12/2001 | Chidlovskii et al. | |
| 6,400,996 | B1 | * | 6/2002 | Hoffberg et al. | 700/83 |
| 6,484,162 | B1 | * | 11/2002 | Edlund et al. | 707/3 |
| 6,671,681 | B1 | | 12/2003 | Emens et al. | |
| 6,781,607 | B1 | * | 8/2004 | Benham | 715/744 |
| 6,978,267 | B2 | * | 12/2005 | Perisic et al. | 707/5 |
| 7,062,711 | B2 | * | 6/2006 | Kethireddy | 715/705 |
| 7,743,047 | B2 | * | 6/2010 | White et al. | 707/710 |
| 2005/0256848 | A1 | | 11/2005 | Alpert et al. | |
| 2006/0047650 | A1 | | 3/2006 | Freeman et al. | |
| 2006/0074890 | A1 | | 4/2006 | Sundharam et al. | |
| 2006/0122974 | A1 | | 6/2006 | Perisic | |
| 2006/0200556 | A1 | | 9/2006 | Brave et al. | |
| 2006/0212423 | A1 | | 9/2006 | Jones et al. | |
| 2006/0253432 | A1 | | 11/2006 | Eagle et al. | |

OTHER PUBLICATIONS

Furnas, G.W., et al., The vocabulary problem in human-system communication: An analysis and a solution, Comm. ACM, Nov. 1987, 30, 11, pp. 964-971.
Granka, L., et al., Eye-tracking analysis of user behavior in WWW search, in Proc. ACM SIGIR, The University of Sheffield, UK, Jul. 25 to Jul. 29, 2004, pp. 478-479.
Holscher, C., et al., Web search behavior of internet experts and newbies, in Proc WWW, Amsterdam, The Netherlands, May 15-19, 2000, pp. 337-346.
Jansen, B.., An investigation into the use of simple queries on Web IR systems, Inf. Res., (2000), 6, 1.Jansen, B. J. 2000.

(Continued)

*Primary Examiner* — James Trujillo
*Assistant Examiner* — Jeffrey Chang
(74) *Attorney, Agent, or Firm* — Lyon & Harr, L.L.P.; Craig S. Fischer

(57) ABSTRACT

A search expertise level system and method for determining a search expertise level of a search engine user and then using that information to improve the searcher's experience. The search expertise level system and method identifies the search expertise level of the searcher based on query behavior, post-query browsing behavior, and other behaviors of the searcher. One simple and important behavior that indicates a skilled searcher is the use of advanced query syntax and operators in the query. Once the search expertise level of a searcher is known, the search engine user interface can be modified and tailored to the needs of both skilled and novice searchers. The search expertise level also can be used to rank search results, such that search results for a novice searcher are ranked differently than those for a skilled searcher. The search expertise level also can be used in advertising and marketing.

18 Claims, 10 Drawing Sheets

OTHER PUBLICATIONS

Jansen, B.J., et al., Real life, real users, and real needs: A study and analysis of user queries on the Web, Inf. Proc. Management, Jan. 1, 2000, 36, 2, pp. 207-227.

Jones, R., et al., Generating query substitutions, in Proc. WWW, Edinburgh, Scotland, May 22-26, 2006, pp. 387-396.

Kaski, S., et al., User models from implicit feedback for proactive information retrieval, in Workshop at UM Conference: Machine Learning for User Modeling: Challenges, (2005).

Kelly, D., et al., The loquacious user: a document-independent source of terms for query expansion., in Proc. ACM SIGIR, Salvador, Brazil, Aug. 15 to 19, 2005, pp. 457-464.

Lazonder, A.W., et al., Differences between novice and experinced users in searching for information on the World Wide Web., J. ASIST, (2000), 51, 6, pp. 576-581.

Morita, M., et al., Information filtering based on user behavior analysis and best match text retrieval., in Proc. ACM SIGIR, Dublin, Ireland—Jul. 3-6, 1994, pp. 272-281.

Popovic, V., Expert and novice users models and their application to the design process, Journal of 6th Asian Design Conference, (2003), Tsukuba, Japan.

Rose, D.E., et al., Understanding user goals in Web search, in Proc. WWW, New York, New York, May 19-21, 2004, pp. 13-19.

Salton, G., et al., Improving retrieval performance by relevance feedback, J. ASIST, (1990), 41, 4, pp. 288-287.

Silverstein, C., et al., Analysis of a very large web search engine query logs, SIGIR Forum, Berkeley, CA, Aug. 15-19, 1999, 33, 1, pp. 6-12.

Sormunen, E., A novel method for the evaluation of boolean query effectiveness across a wide operational range, in Proc. ACM SIGIR, Jul. 2000, Athens, Greece.

Spink, A., et al., From highly relevant to not relevant: examining different regions of relevance, Inf. Proc. Management, (1998), 34 5, pp. 599-621.

Teevan, J., et al., The perfect serch engine is not enough: A study of orienteering behavior in directed search, In Proc. ACM SIGCHI, Vienna, Austria, Apr. 24-29, 2004, pp. 415-422.

Teevan, J., et al., Personalizing search via automated analysis of interests and activities, in Proc. ACM SIGIR, Salvador, Brazil, Aug. 15 to 19, 2005, pp. 449-456.

White, R.W., et al., Finding relevant documents using top-ranking sentences: An evaluation of two alternative schemes, in Proc. ACM SIGIR, Tampere, Finland, Aug. 11-15, 2002, pp. 57-64.

Anick, P., Using terminological feedback for Web search refinement: A log-based study, in Proc. ACM SIGIR, (2003), Toronto, Canada, Jul. 28 to Aug. 1, 2003, pp. 88-95.

Bates, M., Where should the person stop and the information search interface start?, Inf. Proc. Management, (1990), 26, pp. 57-591.

Belkin, N.J., Helping people find what they don't know, Comm. ACM, Aug. 2000, 43, 8, pp. 58-61.

Belkin, N.J., Query length in interactive information retrieval, in Proc. ACM SIGIR, (2003), Toronto, Canada, Jul. 28 to Aug. 1, 2003, pp. 205-212.

Bhavnani, S.K., Domain-specific search strategies for the effective retrieval of healthcare and shopping information, in Proc. ACM SIGCHI, Seattle, Washington, Mar. 31-Apr. 5, 2001, pp. 610-611.

Bhavnani, S.K, et al., Strategy hubs: Next-generation domain portals with search procedures., CHI (2003), Apr. 5-10, 2003, Ft. Lauderdate, Florida, USA, pp. 393-400.

Chi, E.H., et al., Using information scent to model user information needs and actions and the Web., in Proc. ACM SIGCHI, Seattle, Washington, Mar. 31-Apr. 5, 2001, pp. 490-497.

De Lima, E.F., et al., Phrase recognition and expansion for short, precision-biased queries based on a query log, in Proc. of ACM SIGIR, Berkeley, California, Aug. 15-19, 1999, pp. 145-152.

Eastman, C.M., et al., Coverage, relevance, and ranking: The impact of query operators on Web search engine results, ACM TOIS, Oct. 2003, 21, 4, pp. 383-411.

Furnas, G., Experience with an adaptive indexing scheme, in Proc. ACM SIGCHI, San Francisco, California, 1985), pp. 131-135.

* cited by examiner

IDENTIFICATION AND USE OF WEB SEARCHER EXPERTISE

BACKGROUND

It is subjectively clear that some users are "better" than others at searching the Web. Different people have more experience with computers and have greater expertise at searching the Web. Being good at Web searching is independent of a searcher's domain-specific knowledge, and does not mean that the searcher knows a lot about the material for which he is searching. A user's general skill level at searching the Web dictates whether the searcher is a good searcher. For example, certain searchers are better at search tasks such as formulating search queries, quickly evaluating search results, and integrating information from multiple search systems.

While it may be subjectively clear whether a particular user is a skilled searcher, the standard search engine user interface does not distinguish between novice and expert searchers. To date, no system attempts to automatically evaluate a searcher's expertise level and tailor various aspects of the search system accordingly. Current search engines do not care about or take into account a searcher's level of experience searching the Web. The search engine user interface seen by a skillful searcher who has searched the Web 100 times per day for ten years is the same as that seen by a novice who has only searched the Web once or twice.

Some search engine user interfaces include a button that the searcher can click for advanced search features (usually called "advanced search"). This button takes the searcher to a menu that allows the searcher more options, such as Boolean operators. This advanced search option does not change the way the results are presented to the searcher, however, it merely provides the searcher with additional options. Ironically, a skilled searcher typically does not need more options as he will just use advanced search techniques (such as Boolean operators) in the standard query box. The user interface of standard search engines, however, does not attempt to behave differently according to differing searcher expertise levels.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The search expertise level system and method includes determining how good a search engine user is at searching the Web and using that knowledge to improve the searcher's interaction and experience with the search engine. The search expertise level system and method first uses various methods for identifying the search expertise level of a searcher. Once the search expertise level has been determined, this knowledge is used in various ways to benefit the searcher. In addition, the search expertise level can be used to improve search engine performance.

The search expertise level system and method determines a search expertise level by observing behaviors of a searcher. These behaviors include query behavior, post-query browsing behavior, and additional features behavior. One simple query behavior for automatically determining whether a specific user of a Web search engine is a skilled searcher is to determine whether the searcher regularly uses advanced query syntax and operators. Moreover, features such as constructing fewer queries than normal, composing longer queries than normal, clicking further down on a search results list, and submitting more queries per day than normal all suggest a more skilled searcher. Features such as clicking on fewer search results and repeating queries more often than normal also help to identify the search expertise level of a searcher.

Post-query browsing behavior can be used alone or in conjunction with the query behavior to determine search expertise level. Specifically, features such as revisiting pages in a search trail less often than normal, spending less time traversing the search trail, following search trails having fewer steps all indicate a more skilled searcher. In addition, features such as spending less time than normal viewing each document in the search results and branching less often than normal all point to a searcher possessing a higher search expertise level.

Additional behavior other than the query behavior and the post-query browsing behavior may be used to determine search expertise level. For example, features such as using multiple search engines or multiple Web browsers, using tabs, using specific operating systems, and navigating to Web sites that attract expert users all help to indicate more skilled searchers.

Once the search expertise level of a searcher is known there are several ways in which the system and method use this knowledge. For example, search engine user interfaces can be tailored specifically for skilled and novice searchers. A user interface for a skilled searcher can display a higher number of results per page, automatically display a more advanced user interface, and display detailed ranking information about each search result. Furthermore, the user interface can be modified to display a shorter amount of information about each search result, display keyboard shortcuts, and display a personal Web search history of the searcher. These are all features that a more skilled searcher would probably want and use.

A user interface for the novice searcher can display alternate query suggestions based on a library of skilled searcher queries. Moreover, this novice user interface can display a tutorial and a description of how advanced query syntax and advanced query operators would affect a query. Other features that would be useful to novice searchers are displaying a "help" button that is easy to find so that the novice searcher can quickly and easily obtain help in formulating a query, and displaying samples of queries successfully used by skilled searchers on the same or related topics.

The search expertise level system and method also uses the search expertise level of a searcher to rank search results. This means that search results from the search engine are ranked differently for skilled searchers and novice searchers. Moreover, query refinement and automatic query completion is performed using a statistical sampling of queries by skilled searchers. The performance of the search engine also can be evaluated using skilled searchers as a benchmark. A search engine's performance can be graded by determining how well the search engine returns pages that skilled searchers visit. In addition, search expertise level can be used in advertisements and marketing. Advertisements and other online businesses can be targeted specifically at skilled or novice searchers, who have distinctly different behaviors in terms of navigation and clicking on advertisements.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of the search expertise level system and method reference is made to the accompanying drawings, which form a part thereof, and in which is shown by way of illustration a specific example whereby the search expertise level system and method may be practiced. It is to be understood that other embodiments may be utilized and structural changes may be made without departing from the scope of the claimed subject matter.

I. System and Operational Overview

Figure 1:
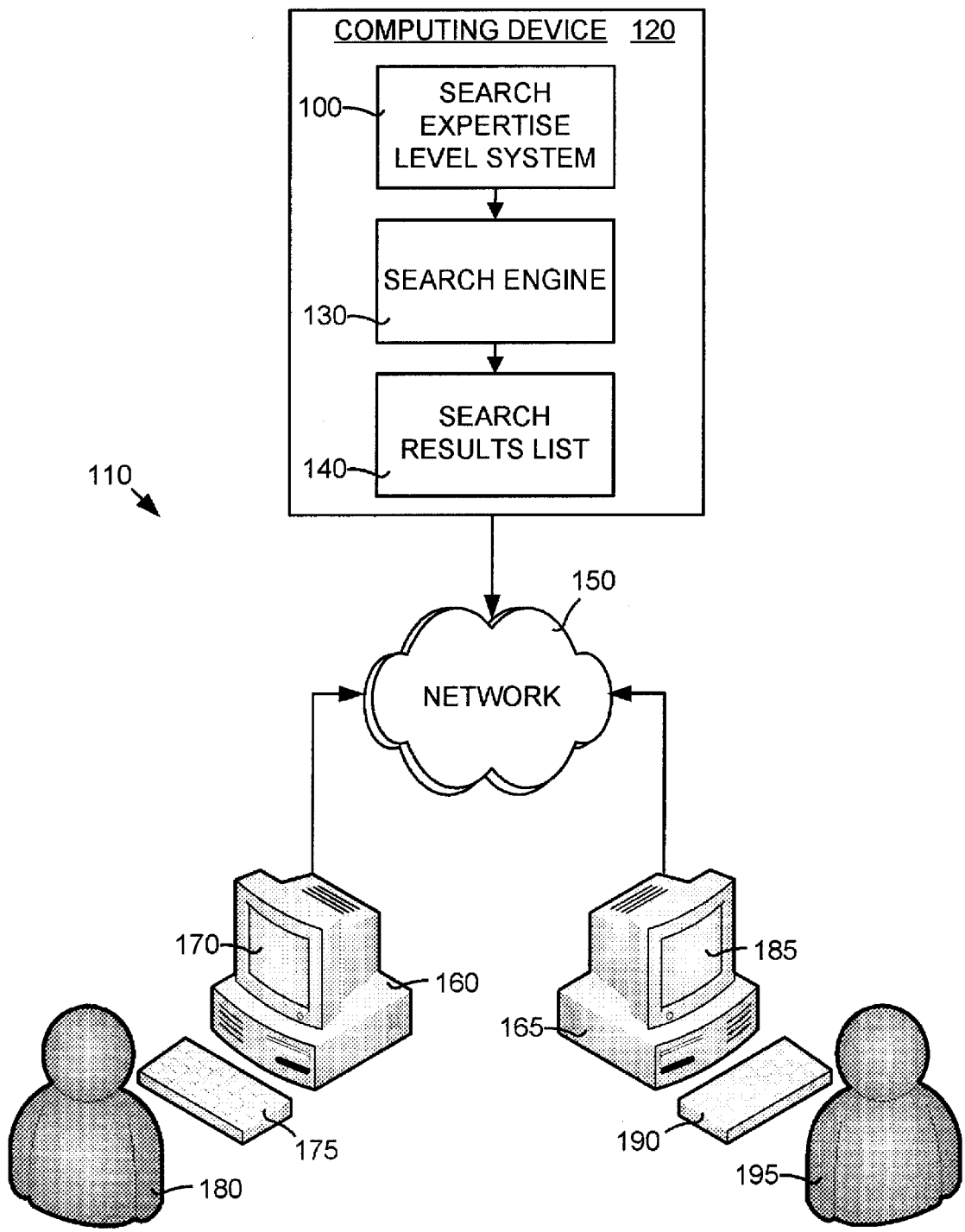
FIG. 1 is a block diagram illustrating the search expertise level system and method disclosed herein implemented in a search engine environment.

FIG. 1 is a block diagram illustrating the search expertise level system and method disclosed herein implemented in a search engine environment. It should be noted that the implementation shown in FIG. 1 is only one of many implementations that are possible. By way of example, FIG. 1 illustrates a client-server relationship. However, the search expertise level system and method also may be implemented entirely on a single computing device.

Referring to FIG. 1, the search expertise level system 100 is shown in a search engine environment 110. The search expertise level system 100 resides on a computing device 120. It should be noted that the computing device 120 may include a single processor (such as a desktop or laptop computer) or several processors and computers connected to each other. The computing device 120 includes the search expertise level system 100, a search engine 130 for processing search requests, and a search results list 140 generated by the search engine 130. The search results list 140 contains a list of search results that are ranked according to relevance of a user-supplied search query. The search results are Web pages that searcher using the search engine 130 can hyperlink to by clicking on the search result.

The computing device 120 is connected to a network 150. Also connected to the network 150 are a first computer 160 and a second computer 165. The first computer 160 includes a first display device 170 and first input device (such as a first keyboard 175) that allows a first user 180 to interface with the search engine 130 and submit queries and obtain the search results list 140 based on the queries. Similarly, the second computer 165 includes a second display device 185 and a second input device (such as a second keyboard 190) that allows a second user 195 to interface with the search engine 130.

As explained in detail below, the search expertise level system 100 is used by the search engine 130 to determine the search expertise level of searchers using the search engine 130 and then act based on this information. For example, referring to FIG. 1, assume that the search expertise level system 100 determines that the first user 180 is a skilled searcher (on a continuum of search expertise levels) and the second user 195 is a novice searcher. Based on this information, the search expertise level system 100 may cause the search engine 130 to display the search results list 140 on the first display device 170 in a format that is more suited for a skilled searcher. This format would be tailored towards the first user's 180 search expertise level such that his search experience would be greatly enriched and improved. On the other hand, the search results list 140 may be displayed to the second user 195 on the second display device 185 in a format that is more suited for a novice searcher. This novice searcher format would be tailored towards the second user's search expertise level also to greatly enrich and improve her search experience. In addition, as detailed below, several other actions could be taken based on the search expertise level of each searcher.

Figure 2:
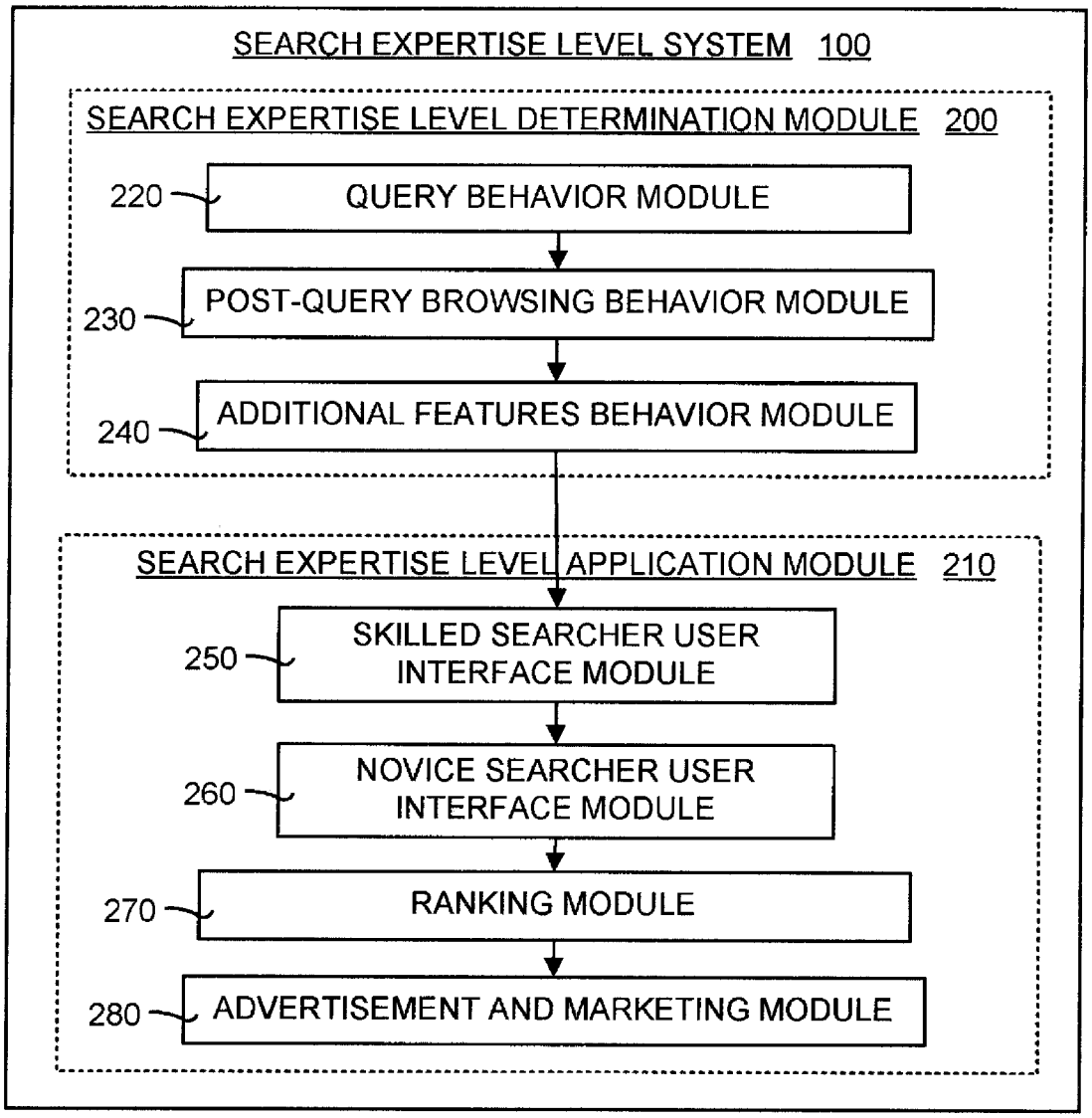
FIG. 2 is a block diagram illustrating an exemplary implementation of the search expertise level system shown in FIG. 1.

FIG. 2 is a block diagram illustrating an exemplary implementation of the search expertise level system 100 shown in FIG. 1. The system 100 includes a search expertise level determination module 200 and a search expertise level application module 210. In general, the search expertise level determination module 200 uses search behavior of a searcher to determine the searcher's expertise level. Once the search expertise level is determined, the search expertise level application module 210 uses the search expertise level in various ways to improve the search engine experience for the searcher.

The search expertise level determination module 200 includes a query behavior module 220, a post-query browsing behavior module 230, and an additional features behavior module 240. The query behavior module 220 determines a searcher's level of search expertise by examining the searcher's query behavior. The post-query browsing behavior module 230 determines search expertise level using the searcher's browsing behavior after search results have been presented to the searcher. The additional features behavior module 240 determines search expertise by examining behaviors other than the query behavior and the post-query browsing behavior.

The search expertise level application module 210 includes a skilled searcher user interface module 250, a novice searcher user interface module 260, a ranking module 270, and an advertisement and marketing module 280. The skilled searcher user interface module 250 builds a search engine user interface that is directed to a skilled searcher, with features that the skilled searcher would find useful and desirable. The novice searcher user interface module builds a search engine user interface for a novice searcher. The ranking module 270 ranks search results based on the search expertise level of the searcher. In addition, the ranking module 270 provides evaluation of the search engine based on behavior of a skilled searcher. The advertisement and marketing module 280 displays advertisements and markets to the searcher based on the searcher's search expertise level.

Figure 3:
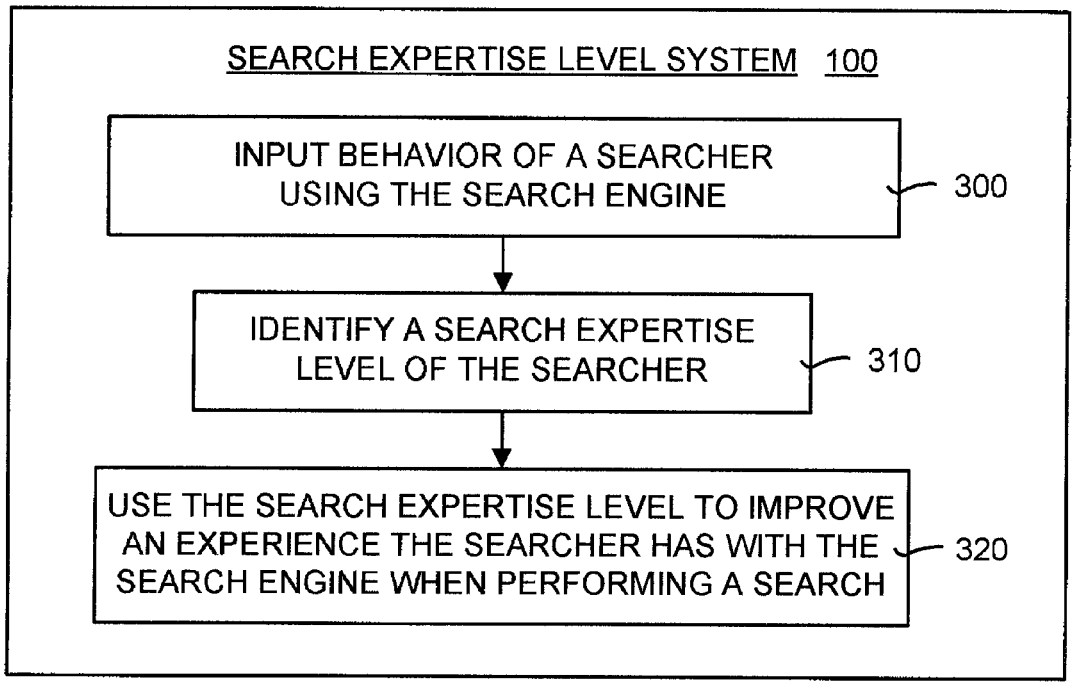
FIG. 3 is a flow diagram illustrating the general operation of the method used in the search expertise level system shown in FIGS. 1 and 2.

FIG. 3 is a flow diagram illustrating the general operation of the method used in the search expertise level system shown in FIGS. 1 and 2. The search expertise level method inputs a behavior of a searcher that is using the search engine (box 300). The behavior is used to identify a search expertise level of the searcher (box 310). Next, the search expertise level is used to improve the experience that the searcher has with the search engine when performing a search.

II. Operational Details

Each of the modules mentioned above will now be discussed in further detail. In particular, details of the query behavior module 220, the post-query browsing behavior module 230, the additional features behavior module 240, the skilled searcher user interface module 250, the novice searcher user interface module 260, the ranking module 270, and the advertisement and marketing module 280 will be discussed to further clarify the details of the search expertise level system and method.

Search Expertise Level Determination

The search expertise level method initially determines the search expertise level of a searcher. Features or indicators that may be used in this determination will now be discussed. While each of these features alone may be too broad to classify a searcher as a skilled searcher or an "expert", combining these features provides a powerful statistical signal that correlates well with search success (as indicated by finding relevant pages). These features, therefore, can be used as a statistical predictor of searcher's expertise level. Moreover, although this document discusses skilled searchers and novice searchers, in reality there is no clear dividing line. Instead, the search expertise level of a searcher is a continuum with a searcher most likely falling somewhere between the two extremes of a skilled searcher and a novice searcher.

Query Behavior Module

Figure 4:
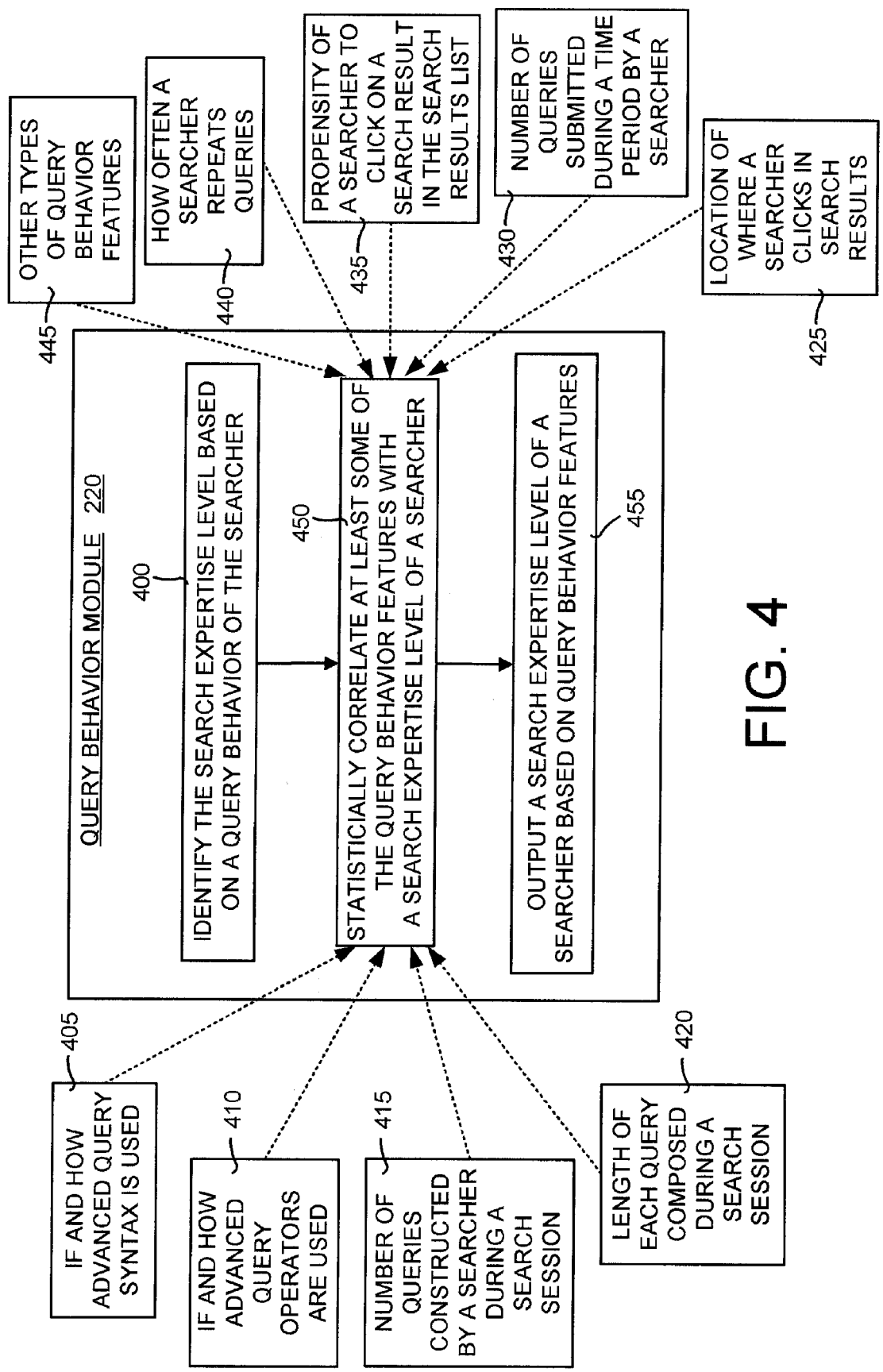
FIG. 4 is a flow diagram illustrating the detailed operation of the query behavior module shown in FIG. 2.

FIG. 4 is a flow diagram illustrating the detailed operation of the query behavior module 220 shown in FIG. 2. In general, the module 220 determines a searcher's search expertise level based on the searcher's query behavior. More specifically, a set of features is used to identify the search expertise level of a searcher. These features can be used in conjunction with any machine learning or regression system to determine the feature's specific correlation to search expertise level. Note that although a limited set of features is discussed herein, many other types of features may be used to identify the search expertise level.

The operation begins by identifying the search expertise level based on a query behavior of the searcher (box 400). This can be achieved using a variety of query behavior features in endless combinations. These query behavior features are associated, either positively or negatively, with the search level expertise of a searcher. For example, query behavior feature "a" and query behavior "b" in moderation and the absence of query behavior feature "c" may indicate a certain search expertise level. As another example, perhaps half of the query behavior features are halfway true, and this indicates that a searcher is somewhat skilled. Also by way of example, perhaps a searcher that is an expert searcher exhibits most, but not all, of the query behavior features.

FIG. 4 illustrates some query behavior features that may be used to identify a searcher's search expertise level. As each of these query behavior features is optional it is shown by a dashed line. One possible query behavior feature includes if and how advanced query syntax is used by the searcher (box 405). In addition, another possible query behavior feature includes if and how the searcher uses advanced query operators (box 410).

The main idea behind this procedure is the assumption that if a searcher knows about advanced search syntax and operators then he probably is a skilled searcher. All popular Web search engines offer a variety of "query operators" that can be used to restrict a search with more specificity than is possible with a simple text query. For example, common advance query operators include "and", "or", "+", "−", quotation marks, and "site:", and "filetype:". Many users are not aware that these operators exist, or are intimidated by their complexity and prefer to use simple text queries. The module 220 assumes that the group of searchers that demonstrates familiarity with these operators and query syntax belong to a separate class of searchers that can loosely be called "experts" or "skilled searchers." These searchers ultimately find pages that are more relevant to their queries (which is a strong measure of expertise), so labeling them skilled searchers is not arbitrary. It should be noted that while this simple stratification will not always completely separate "experts" from "novices", the use of advanced query syntax and operators can in fact powerfully separate Web searchers into two distinct behavioral classes along the search expertise level continuum.

There are also several other query behavioral differences between skilled and novice searchers. These behaviors can easily be tracked and observed over a period of time, making it possible to classify a searcher as a skilled searcher at one extreme, a novice searcher at another extreme, and anywhere in between on a continuum of search expertise.

Another possible query behavior feature includes the number of queries that are constructed by the searcher during a search session (box 415). Another possible feature includes a length of each query composed during the search session (box 420). In general, relative to novice searchers, skilled searchers tend to query less frequently in a session and compose longer queries. Another possible feature includes a location where the searcher clicks in the search results (box 425). Moreover, a possible feature includes the number of queries submitted during a certain time period by the searcher (box 430). Generally, skilled searchers tend to click further down the search results list than a normal searcher and tend to submit more queries per day than normal searchers. Still more possible features include a propensity for the searcher to click on a searcher result in the search results list (box 435) and how often the searcher repeats queries (box 440). Generally, skilled searchers are less likely to click on a result in the search results list and tend to repeat queries more often than is normally done by less experienced searchers. In addition, numerous other types of query behavior features may be used in the determination of the search expertise level (box 445). The query behavior module 220 then statistically correlates at least some of these query behavior features with a search expertise level of the searcher (box 450). Once the search expertise level is determined, it is output from the module (box 455).

Post-Query Browsing Behavior Module

Figure 5:
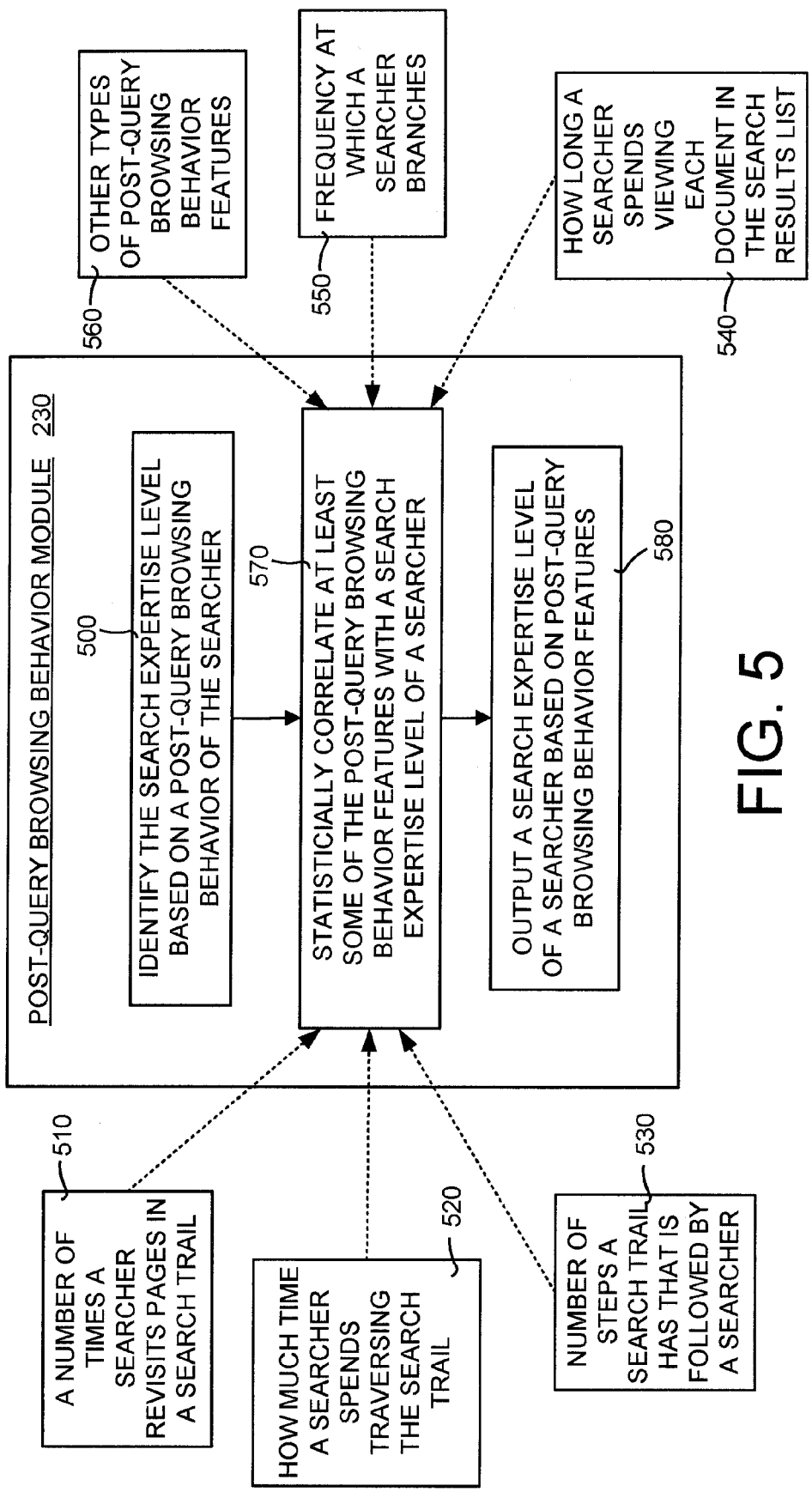
FIG. 5 is a flow diagram illustrating the detailed operation of the post-query browsing behavior module shown in FIG. 2.

FIG. 5 is a flow diagram illustrating the detailed operation of the post-query browsing behavior module 230 shown in FIG. 2. In general, the module 230 determines the search expertise level of a searcher based on the searcher's browsing behavior after a query has been submitted to a search engine. The module 230 begins by identifying the search expertise level of a searcher based on a post-query browsing behavior of the searcher (box 500). This can be achieved using any combination of post-query browsing behavior features.

One post-query browsing behavior features includes a number of times a searcher revisits pages in a search trail (box 510). Typically, a more skilled searcher revisits pages in a search trail less often than normal. A search trail is defined as a consecutive series of Web pages that lay on a hyperlink trail originating with a click on a search engine result and ending with the user performing an activity unrelated to the current search (such as returning to their Web browser's homepage). Search trails can be extracted from interaction logs, as is well known in the art. Another possible post-query browsing behavior feature is the amount of time a searcher spends traversing each search trail (box 520). In addition, another feature is the number of steps in each search that is followed by a searcher (box 530). A skilled searcher often follows search trails that contain fewer steps than the average search trail.

Another type of post-query browsing behavior feature that may be used by the module 230 is the amount of time a searcher spends viewing each document in the search results list (box 540). More skilled searchers generally spend less than normal viewing each document or page in the search results list. Another feature is the frequency at which a searcher branches (box 550). A skilled searcher usually branches less often than normal. "Branching" is an operation whereby the searcher executes a back operation to revisit a page previously encountered on the trail, and then proceeds to a new page not on the trail. Any one of these factors, alone or in combination, can be used to determine the searcher's search expertise. Moreover, numerous other types of post-query browsing behavior features may be used in the determination of the search expertise level (box 560). The post-query browsing behavior module 230 then statistically correlates at least some of these post-query browsing behavior features with a search expertise level of the searcher (box 570). Once the search expertise level based on post-query browsing behavior features is determined, it is output from the module (box 580).

Additional Features Behavior Module

Figure 6:
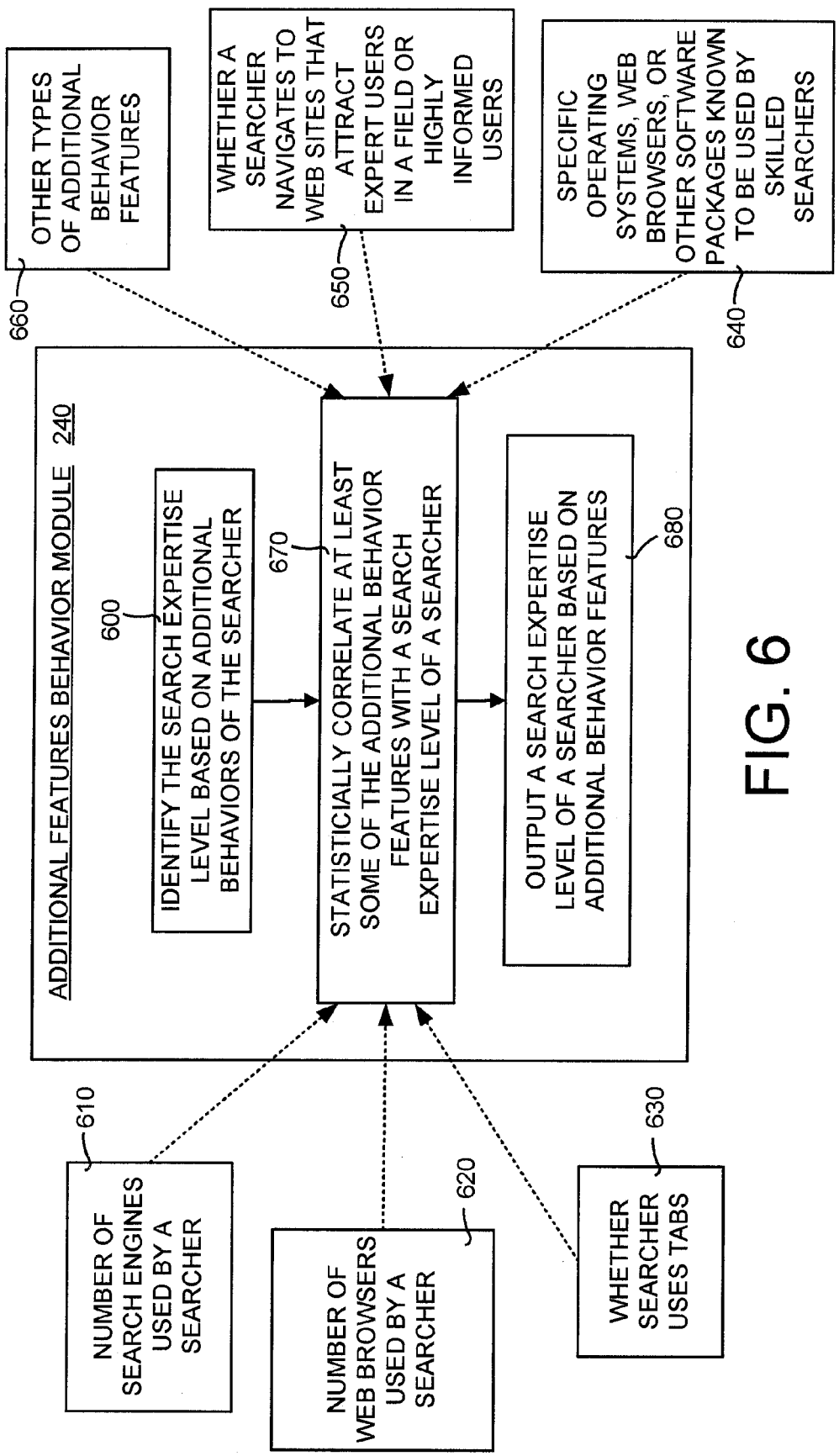
FIG. 6 is a flow diagram illustrating the detailed operation of the additional features behavior module shown in FIG. 2.

FIG. 6 is a flow diagram illustrating the detailed operation of the additional features behavior module 240 shown in FIG. 2. In general, the module 240 determines the search expertise level of a searcher based on the searcher's behaviors other than query behavior and post-query browsing behavior. The operation of the module 240 begins by identifying the search expertise level of a searcher based on additional behaviors of the searcher (box 600). This can be achieved using any combination of additional behavior features.

One of the additional behavior features is the number of different search engines used by a searcher (box 610). Another feature is the number of different Web browsers used by a searcher (box 620), or the number of concurrent Web browsers used by a searcher. Typically, a larger number of search engines and/or Web browsers used by a searcher indicates a higher level of search expertise. Another additional behavior feature that may by used is the use of Web browser tabs by the searcher (box 630). Other features may include whether the searcher uses specific operating systems, search engines, Web browsers, or other software packages known to be used by skilled searchers (box 640). Another additional behavior feature that may be used by the module 240 is whether a searcher navigates to Web sites that attract expert users in their field or highly informed users (box 650). For example, these Web sites may include technical news sites (such as Slashdot), technical documentation sites (such as msdn.microsoft.com), or other pages that can be statistically correlated with the features described above.

Moreover, numerous other types of additional behavior features may be used in the determination of the search expertise level (box 660). By way of example, these addition behavior features include comparing a searcher's queries with the queries of known skilled searchers. In particular, given a population of searchers labeled according to their search expertise using one or more of the above mechanisms, a searcher's search expertise level can be assigned by analyzing the content of searcher's queries and observing the known expertise level of other searchers who have submitted similar queries. If a searcher submits a series of queries that has been submitted by 500 other users, 480 of whom were labeled skilled searchers, then it is likely that the searcher is also a skilled searcher. Similarly, if a searcher submits a query that has been submitted equally by both skilled and novice searchers but then the searcher refines or modifies the query in a manner that is consistent with the behavior of a skilled searcher, then the searcher is most likely a skilled searcher. This behavior can be tracked over several sessions of querying and potentially can build a picture of a searcher's search expertise level more rapidly than the above mechanisms. The additional features behavior module 240 then statistically correlates at least some of these additional behavior features with a search expertise level of the searcher (box 670). Once the search expertise level based on additional behavior features is determined, it is output from the module (box 680).

Search Expertise Level Application

After having determined the search expertise level of a searcher, the search expertise level method then applies this knowledge in various ways to enhance a searcher's experience with the search engine.

Skilled Searcher User Interface Module

Figure 7:
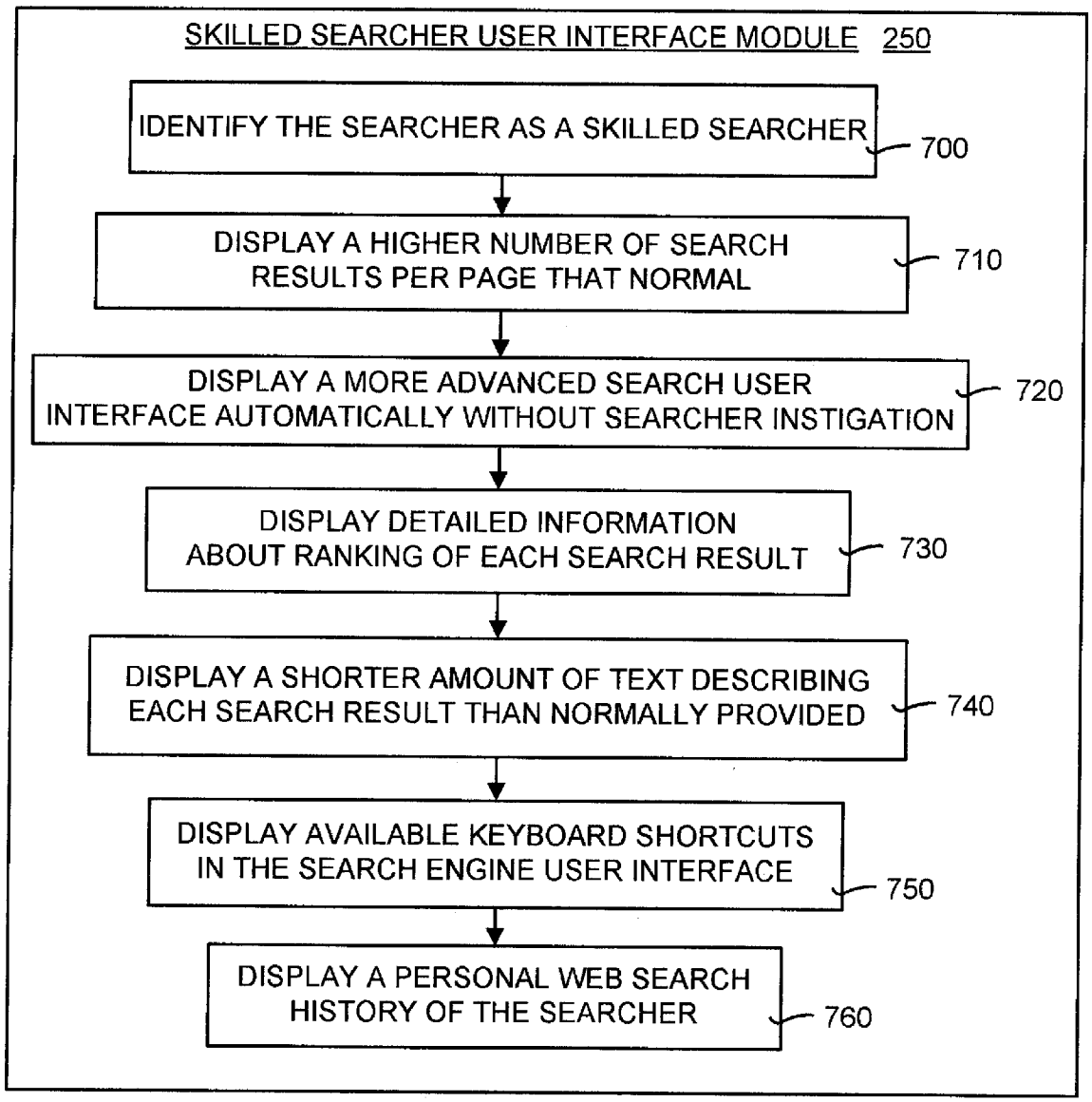
FIG. 7 is a flow diagram illustrating the detailed operation of the skilled searcher user interface module shown in FIG. 2.

FIG. 7 is a flow diagram illustrating the detailed operation of the skilled searcher user interface module 250 shown in FIG. 2. In general, the module 250 builds a search engine user interface that is designed to meet the needs of a skilled searcher. The main idea is that skilled searchers and novice searchers do not necessarily want or need the same search engine user interface. The user interfaces are specifically tailored to a certain search expertise level.

The module 250 begins by identifying the searcher as a skilled searcher using the methods discussed above (box 700). Next, the module 250 may modify the user interface to display a higher number of search results per page as compared to a normal presentation (box 710). Skilled searchers may benefit from a higher number of search results per page by default, since they are likely to look further down the search results list before selecting results. The module 250 may display a more advanced search user interface automatically by default and without searcher instigation when the searcher is identified as a skilled searcher (box 720). Skilled searchers are more likely to use advanced options and may benefit from direct access to the "advanced search" interface that exists for most search engines but is generally accessible only via a secondary click.

The module 250 may also display detailed information about the ranking of each search result (box 730). Skilled searchers, who are more likely to understand search ranking systems, may benefit from more information about each search result. This information includes the number of links of a page, search ranking, traffic information, and last update time. The module 250 may also display a shorter amount of text describing each search results than is normally displayed (box 740). Skilled searchers, who are able to more rapidly assess search results, may benefit from shorter search result description (or search "snippets") in exchange for more search results per viewable area than novice searchers. Similarly, skilled searchers may be more amenable to filling more screen space with additional columns of results, which may serve to only confuse novice searchers.

The module 250 also may modify the search engine user interface to display available keyboard shortcuts in the user interface (box 750). Skilled searchers, who are more likely to use keyboard shortcuts, may benefit from immediate display of keyboard shortcuts and more available keyboard shortcuts. For example, there may be shortcuts for "go to result n" or "go to the next/previous page of search results". The module 250 may display a personal Web search history of the searcher (box 760). Skilled searchers are more likely to repeat the same query and may benefit from personal histories and support for rapid re-visitation to Web sites that are frequently encountered.

Novice Searcher User Interface Module

Figure 8:
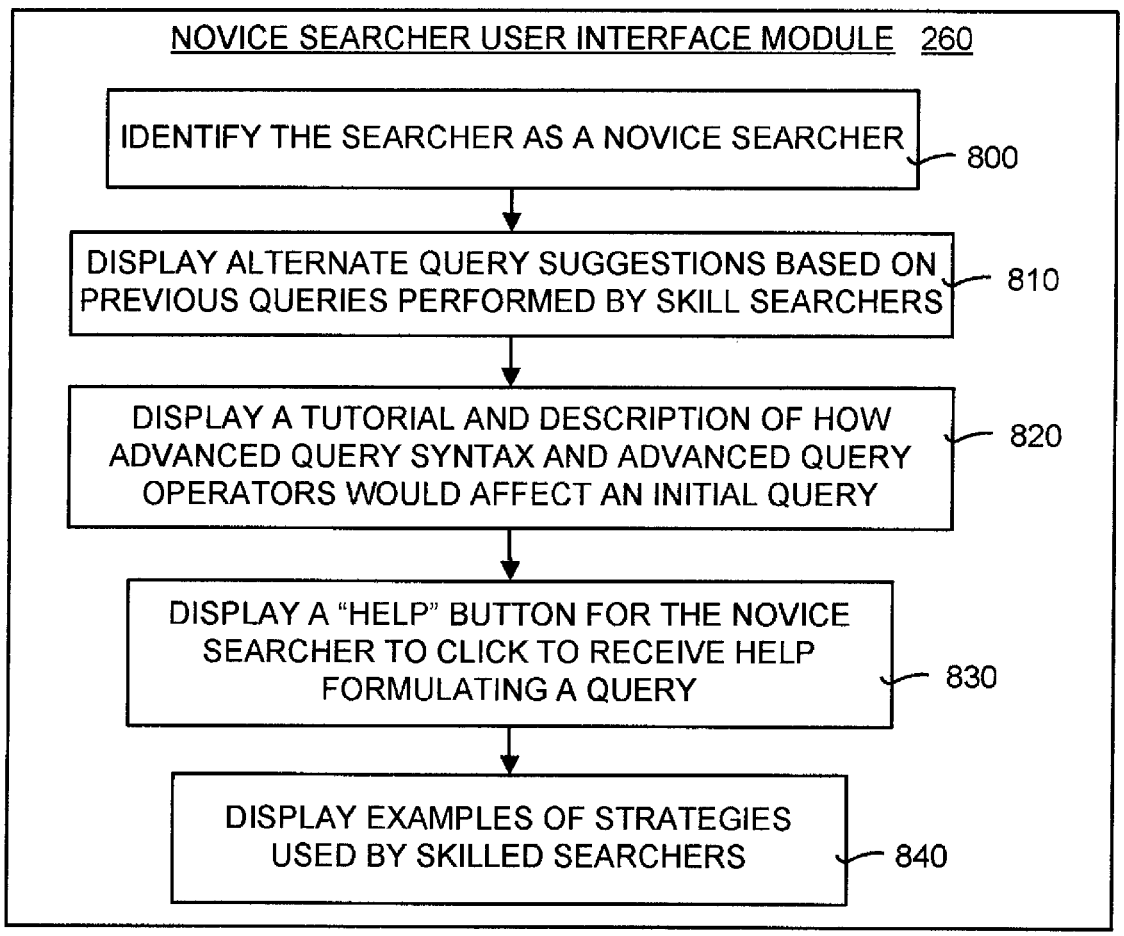
FIG. 8 is a flow diagram illustrating the detailed operation of the novice searcher user interface module shown in FIG. 2.

FIG. 8 is a flow diagram illustrating the detailed operation of the novice searcher user interface module 260 shown in FIG. 2. Generally, the module 260 builds a search engine user interface that is designed for a novice searcher. The module 260 begins by identifying the searcher as a novice searcher using the methods discussed above (box 800).

The module 260 may modify a search engine user interface to display alternate query suggestions based on previous queries performed by skilled searchers (box 810). In effect, these are "ideal queries" or "optimal queries." Novice searchers, who likely require more help with query refinement, may benefit from immediate display of alternate query suggestions that might be hidden from experts. The module 260 also may display a tutorial and description of how advanced query syntax and advanced query operators would affect an initial query submitted by the novice searcher (box 820). Novice searchers are likely to be less familiar with advanced query syntax and operators. These novice searchers may benefit from descriptions of the effect (or lack of effect) of any advanced operators present in their queries.

The module 260 also may display a salient "help" button on the user interface (box 830). The novice searcher can click on the help button to receive assistance in formulating a query. The module 260 may display examples of strategies used by skilled searchers (box 840). Novice searchers typically use less effective searching strategies. Novice searchers may benefit from examples of strategies used by skilled searchers having more search expertise when looking for related items. Moreover, in general novice searchers may be unsure why particular documents have been retrieved or query suggestions offered to them. Thus, novice searchers may benefit from clear explanations that briefly describe in simple terms the reasoning behind the documents and query suggestions offered to them.

Ranking Module

Figure 9:
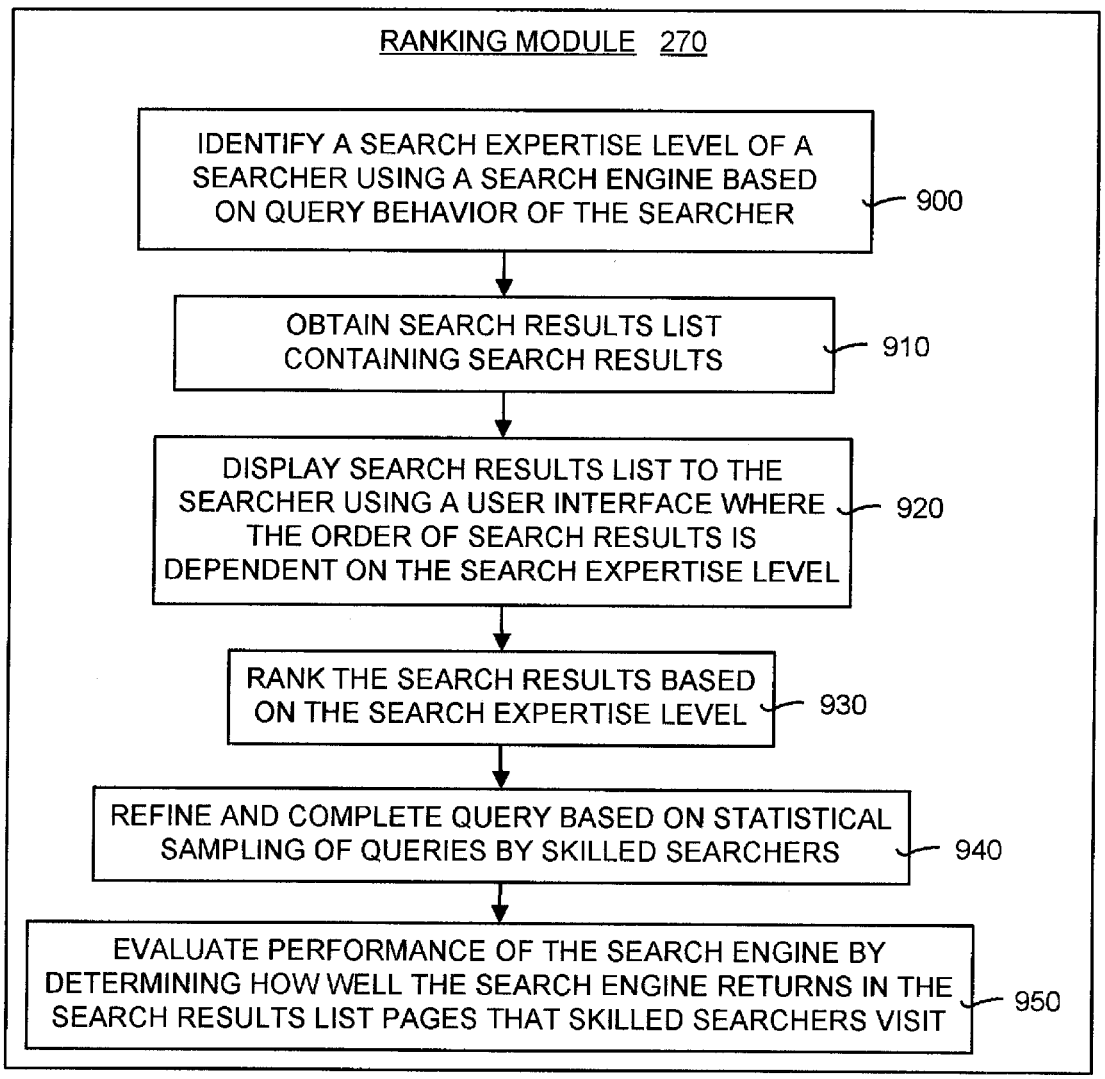
FIG. 9 is a flow diagram illustrating the detailed operation of the ranking module shown in FIG. 2.

FIG. 9 is a flow diagram illustrating the detailed operation of the ranking module 270 shown in FIG. 2. Generally, the module 270 ranks the search results based on the search expertise level of the searcher. The module 270 begins by identifying the search expertise level of a searcher using a search engine based on a query behavior of the searcher (box 900). Methods to find the search expertise level based on query behavior were discussed above.

Next, the module 270 obtains a search results list that contains search results (box 910). This list typically is obtained from the search engine. The module 270 then displays the search results list using a search engine user interface (box 920). The order of the search results is dependent on the search expertise level of the searcher. Novice and skilled searchers typically do not want to see the same results. Just as page relevance is incorporated into current search systems, the ranking module 270 uses the search expertise level of the searcher as an input to the ranking engine to retrieve pages that are appropriate for the searcher's expertise level. In some embodiments this may be a continuous phenomenon, wherein page x is preferred by skilled searchers but not by novice searchers, so the page is ranked slightly higher for skilled searchers. In other embodiments, this may be a discrete phenomenon for separating or disambiguating whole classes of results.

The module 270 then ranks the search results based on the search expertise level of the searcher (box 930). Current approaches to ranking Web pages make use of a variety of features including link structure and sparsely-sampled explicit relevance labeling. However, all of these "artificially intelligent" mechanisms likely fall significantly short of the relevance assignments that a skilled searcher with an infinite amount of time could make. The state of technology is similar for query suggestions. The module 270 ranks pages based on whether and how often they are visited by skilled searchers and how long the skilled searchers spend viewing the pages.

In some embodiments, the module 270 also includes query refinement or query completion suggestions. In particular, the module 270 refines and completes a query based on statistical sampling of queries by skilled searchers (box 940). In other words, the refinement and completion suggestions are based on a statistical sampling of all executed queries and can be biased toward the queries or refinements submitted by skilled searchers. For example, if a searcher queries for "good restaurants in Bellevue", it might be found that many novice searchers follow this particular query with "good restaurants East Side", but skilled searchers more often choose "restaurant ratings 98008". The module 270 would bias query refinement suggestions toward the latter query.

The module 270 also may be used to evaluate the performance of the search engine by determining how well the search engine returns in the search results list pages that skilled searchers visit (box 950). Studies suggest that around 20% of the search population exhibit skilled search characteristics and that the pages experts visit are more relevant. This is a large number of skilled searchers whose interactions may be valuable in determining search engine performance. The Web pages that skilled searchers visit on their search trails may provide a reasonable approximation of relevance that can be leveraged for search engine evaluation. At present, ratings used for evaluation are generated by trained human judges in a labor-intensive process. The queries and documents visited by skilled searchers can be used to create standards or a touchstone that can supplement the human-derived relevance judgments. This could dramatically increase the amount of information available to search engines in determining how effective they are at finding relevant information. A search engine that ranked highly the documents that skilled searchers visit over a large set of test queries would be regarded as performing well with this measure.

Advertisement and Marketing Module

Figure 10:
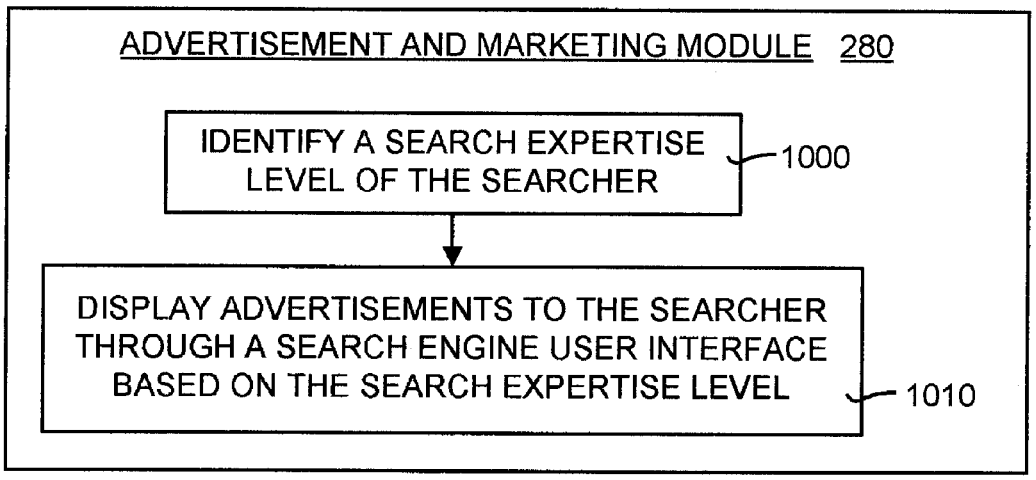
FIG. 10 is a flow diagram illustrating the detailed operation of the advertisement and marketing module shown in FIG. 2.

FIG. 10 is a flow diagram illustrating the detailed operation of the advertisement and marketing module 280 shown in FIG. 2. In general, the module 280 modifies the search engine user interface to display advertisements based on the search expertise level of the searcher. The module 280 initially identifies the search expertise level of the searcher using methods described above (box 1000). Next, the module 280 displays advertisements to the searcher through the search engine user interface based on the search expertise level of the searcher (box 1010).

Anecdotal results from research studies indicate that skilled searchers are less likely to click on search engine advertisements (sponsored links) than novice searchers. It may therefore be sensible from a business perspective to sell advertising space based on search expertise, for search engine pages or other Web sites. The ability to quickly collect a simple profile that statistically correlates with search skill opens up the possibility of expertise-specific marketing. For example, some advertisers might pay more to advertise to novice searchers, who are known to be more likely to click on advertisements overall, while other advertisers might pay more to advertise to skilled searchers.

III. Exemplary Operating Environment

The search expertise level system and method is designed to operate in a computing environment. The following discussion is intended to provide a brief, general description of a suitable computing environment in which the search expertise level system and method may be implemented.

Figure 11:
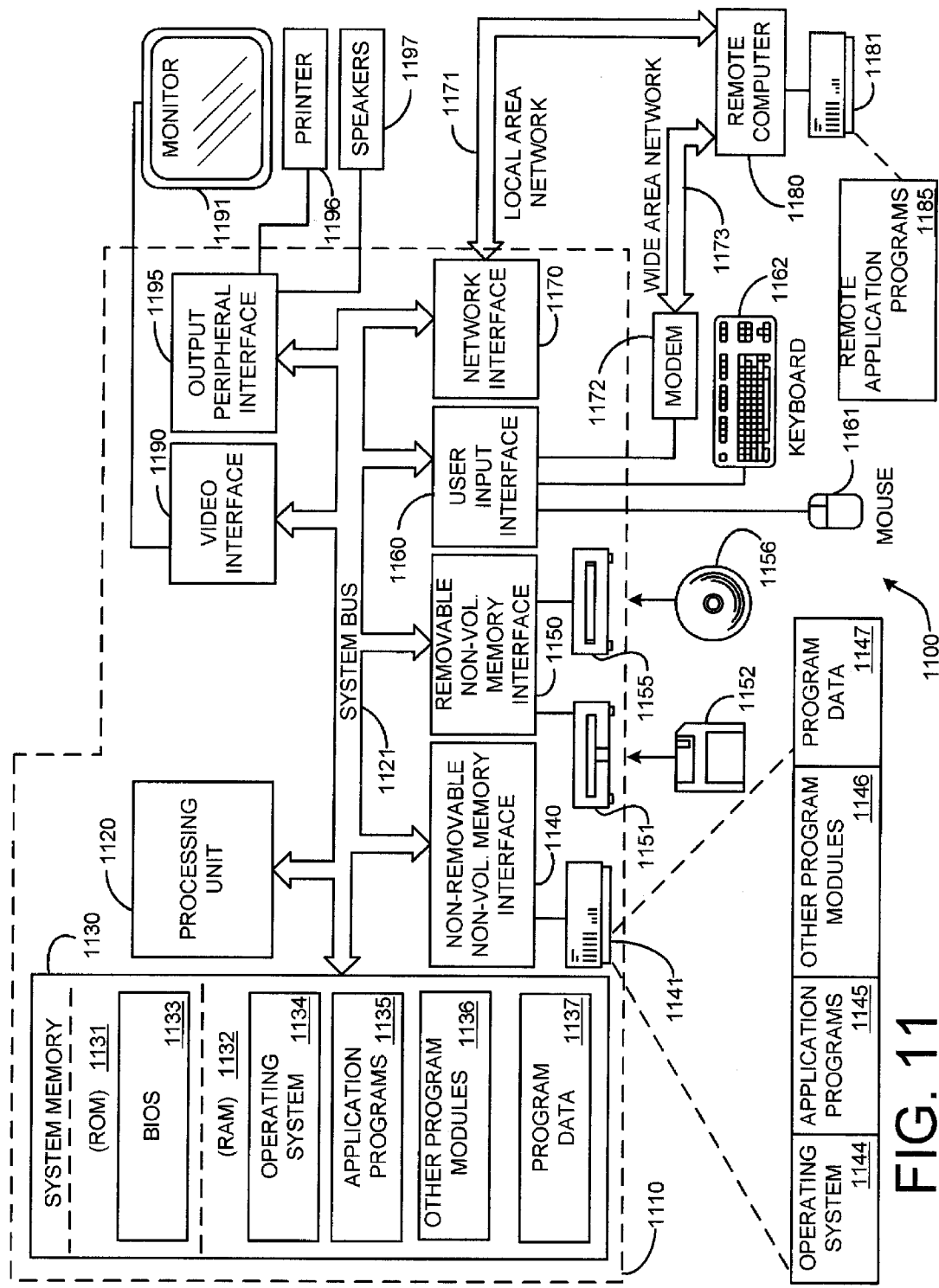
FIG. 11 illustrates an example of a suitable computing system environment in which the search expertise level system and method shown in FIGS. 1-10 may be implemented.

FIG. 11 illustrates an example of a suitable computing system environment in which the search expertise level system and method shown in FIGS. 1-10 may be implemented. The computing system environment 1100 is only one example of a suitable computing environment and is not intended to suggest any limitation as to the scope of use or functionality of the invention. Neither should the computing environment 1100 be interpreted as having any dependency or requirement relating to any one or combination of components illustrated in the exemplary operating environment.

The search expertise level system and method is operational with numerous other general purpose or special purpose computing system environments or configurations. Examples of well known computing systems, environments, and/or configurations that may be suitable for use with the search expertise level system and method include, but are not limited to, personal computers, server computers, hand-held (including smartphones), laptop or mobile computer or communications devices such as cell phones and PDA's, multi-processor systems, microprocessor-based systems, set top boxes, programmable consumer electronics, network PCs, minicomputers, mainframe computers, distributed computing environments that include any of the above systems or devices, and the like.

The search expertise level system and method may be described in the general context of computer-executable instructions, such as program modules, being executed by a computer. Generally, program modules include routines, programs, objects, components, data structures, etc., that perform particular tasks or implement particular abstract data types. The search expertise level system and method may also be practiced in distributed computing environments where tasks are performed by remote processing devices that are linked through a communications network. In a distributed computing environment, program modules may be located in both local and remote computer storage media including memory storage devices. With reference to FIG. 11, an exemplary system for the search expertise level system and method includes a general-purpose computing device in the form of a computer 1110 (the computing device 110, first computer 160, and second computer 165 are examples of the computer 1110).

Components of the computer 1110 may include, but are not limited to, a processing unit 1120 (such as a central processing unit, CPU), a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1110 typically includes a variety of computer readable media. Computer readable media can be any available media that can be accessed by the computer 1110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 1110. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1140 includes computer storage media in the form of volatile and/or nonvolatile memory such as read only memory (ROM) 1131 and random access memory (RAM) 1132. A basic input/output system 1133 (BIOS), containing the basic routines that help to transfer information between elements within the computer 1110, such as during start-up, is typically stored in ROM 1131. RAM 1132 typically contains data and/or program modules that are immediately accessible to and/or presently being operated on by processing unit 1120. By way of example, and not limitation, FIG. 11 illustrates operating system 1134, application programs 1135, other program modules 1136, and program data 1137.

The computer 1110 may also include other removable/non-removable, volatile/nonvolatile computer storage media. By way of example only, FIG. 11 illustrates a hard disk drive 1141 that reads from or writes to non-removable, nonvolatile magnetic media, a magnetic disk drive 1151 that reads from or writes to a removable, nonvolatile magnetic disk 1152, and an optical disk drive 1155 that reads from or writes to a removable, nonvolatile optical disk 1156 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1141 is typically connected to the system bus 1121 through a non-removable memory interface such as interface 1140, and magnetic disk drive 1151 and optical disk drive 1155 are typically connected to the system bus 1121 by a removable memory interface, such as interface 1150.

The drives and their associated computer storage media discussed above and illustrated in FIG. 11, provide storage of computer readable instructions, data structures, program modules and other data for the computer 1110. In FIG. 11, for example, hard disk drive 1141 is illustrated as storing operating system 1144, application programs 1145, other program modules 1146, and program data 1147. Note that these components can either be the same as or different from operating system 1134, application programs 1135, other program modules 1136, and program data 1137. Operating system 1144, application programs 1145, other program modules 1146, and program data 1147 are given different numbers here to illustrate that, at a minimum, they are different copies. A user may enter commands and information (or data) into the computer 1110 through input devices such as a keyboard 1162, pointing device 1161, commonly referred to as a mouse, trackball or touch pad, and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 1120 through a user input interface 1160 that is coupled to the system bus 1121, but may be connected by other interface and bus structures, such as, for example, a parallel port, game port or a universal serial bus (USB). A monitor 1191 or other type of display device is also connected to the system bus 1121 via an interface, such as a video interface 1190. In addition to the monitor, computers may also include other peripheral output devices such as speakers 1197 and printer 1196, which may be connected through an output peripheral interface 1195.

The computer 1110 may operate in a networked environment using logical connections to one or more remote computers, such as a remote computer 1180. The remote computer 1180 may be a personal computer, a server, a router, a network PC, a peer device or other common network node, and typically includes many or all of the elements described above relative to the computer 1110, although only a memory storage device 1181 has been illustrated in FIG. 11. The logical connections depicted in FIG. 11 include a local area network (LAN) 1171 and a wide area network (WAN) 1173, but may also include other networks. Such networking environments are commonplace in offices, enterprise-wide computer networks, intranets and the Internet.

When used in a LAN networking environment, the computer 1110 is connected to the LAN 1171 through a network interface or adapter 1170. When used in a WAN networking environment, the computer 1110 typically includes a modem 1172 or other means for establishing communications over the WAN 1173, such as the Internet. The modem 1172, which may be internal or external, may be connected to the system bus 1121 via the user input interface 1160, or other appropriate mechanism. In a networked environment, program modules depicted relative to the computer 1110, or portions thereof, may be stored in the remote memory storage device. By way of example, and not limitation, FIG. 11 illustrates remote application programs 1185 as residing on memory device 1181. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method for improving an implementation of a search engine, comprising:

identifying a level of search expertise of a searcher that is using the search engine based on a query behavior of the searcher;

identifying the search expertise level based on a post-query browsing behavior of the searcher in relation to a search trail, the post-query browsing behavior defined as browsing behavior of the searcher after a query has been submitted to the search engine and the search results have been returned to the searcher and the search trail defined as a consecutive series of Web pages that lay on a hyperlink trail originating with a click on a search engine result and ending with the searcher performing an activity unrelated to a current search;

statistically correlating at least one of a plurality of query behavior features with the search expertise level of the searcher;

identifying if and how the searcher uses advanced query syntax and advanced query operators as a query behavior feature such that searchers that use advanced query syntax and advanced query operators are more likely to be identified as expert searchers; and classifying the searcher as either a skilled searcher or a novice searcher based whether the search expertise level of the searcher falls on a continuum of search expertise closer to a skilled searcher or a novice searcher, where the search expertise continuum has at one extreme the skilled searcher and at another extreme the novice searcher;

using the search expertise level classification to improve the experience that the searcher has with the search engine when performing a search.

2. The method of claim 1, further comprising:
identifying a number of queries that are constructed by the searcher during a search session as a query behavior feature; and
identifying a number of queries submitted during a time period by the searcher as a query behavior feature.

3. The method of claim 1, further comprising:
identifying a length of each query composed by the searcher during a search session as a query behavior feature; and
identifying a propensity of the searcher to click on a search result in a search results list as a query behavior feature.

4. The method of claim 1, further comprising:
identifying a location of where the searcher clicks in search results as a query behavior feature; and
identifying how often the searcher repeats a query as a query behavior feature.

5. The method of claim 1, further comprising identifying the search expertise level based on a post-query browsing behavior, which is browsing behavior of the searcher after a query has been submitted to the search engine and a search results list has been returned to the searcher.

6. The method of claim 5, further comprising:
statistically correlating at least one of a plurality of post-query browsing behavior features with the search expertise level of the searcher; and
identifying a number of times the searcher revisits pages in a search trail as a post-query browsing behavior feature.

7. The method of claim 6, further comprising:
identifying an amount of time the searcher spends traversing the search trails as a post-query browsing behavior feature; and
identifying how long the searcher spends viewing each document in a search results list as a post-query browsing behavior feature.

8. The method of claim 6, further comprising:
identifying a number of steps in the search trail that is followed by the searcher as a post-query browsing behavior feature; and
identifying a frequency at which the searcher branches as a post-query browsing behavior feature.

9. The method of claim 1, further comprising:
identifying the search expertise level based on additional behaviors of the searcher;
statistically correlating at least one of a plurality of additional behavior features with the search expertise level of the searcher; and
identifying at least one of the following as an additional behavior feature: (a) a number of different search engines used by the searcher; (b) a number of different Web browsers using by the searcher; (c) whether the searcher uses Web browser tabs; (d) specific operating systems, Web browsers, or other software packages known to be used by skilled searchers; (e) whether a searcher navigates to Web sites that attract expert users in a field or highly informed users.

10. The method of claim 1, further comprising
identifying the searcher as a skilled searcher;
displaying a higher number of search results per page than normally displayed;
displaying a more advanced search user interface automatically without a need for the searcher to click on an "advanced search" button; and
displaying detailed information about how and why each search result received it ranking in the search results list.

11. The method of claim 10, further comprising
displaying a shorter amount of text describing each search result than is normally provided such that the amount of text describing each search result is inversely proportional to the search expertise level;
displaying available keyboard shortcuts in a user interface that can be used to navigate a search results list containing the search results; and
displaying a personal Web search history to the searcher such that a previously executed search can be easily repeated by the searcher.

12. The method of claim 1, further comprising
identifying the searcher as a novice searcher;
displaying alternate query suggestions to the novice searcher to aid the searcher in refining an initial query, wherein the alternate query suggestions are based on queries performed by skilled searchers; and
displaying a tutorial and description of how advanced query syntax and operators would affect the initial query.

13. The method of claim 12, further comprising
displaying a "help" button that the novice searcher can click on to receive help with formulating a query; and
displaying examples of strategies used by skilled searchers when looking for topics related to the initial query, including examples of the skilled searchers query and post-query browsing behaviors.

14. A computer-readable storage medium having stored and encoded thereon computer-executable instructions for using a search expertise level in displaying data in a search engine, comprising:
identifying the search expertise level of a searcher using the search engine based on a query behavior of the searcher;
statistically correlating at least one of a plurality of query behavior features with the search expertise level of the searcher;
identifying if and how the searcher uses advanced query syntax and advanced query operators as a query behavior feature such that searchers that use advanced query syntax and advanced query operators are more likely to be identified as expert searchers;
obtaining a search results list containing search results;
displaying the search results list to the searcher using a user interface such that the order of search results is dependent on the search expertise level; and
identifying the search expertise level based on a post-query browsing behavior of the searcher in relation to a search trail, the post-query browsing behavior defined as browsing behavior of the searcher after a query has been submitted to the search engine and the search results have been returned to the searcher and the search trail defined as a consecutive series of Web pages that lay on a hyperlink trail originating with a click on a search engine result and ending with the searcher performing an activity unrelated to a current search.

15. The computer-readable storage medium of claim 14, further comprising ranking the search results based on the search expertise level.

16. The computer-readable storage medium of claim 15, further comprising ranking the search results based on how often skilled searchers visit a page represented by a search result, such that a first page visited by a skilled searcher more frequently than a second page is ranked higher in the search results than the second page.

17. The computer-readable storage medium of claim 14, further comprising evaluating performance of the search engine by determining how well the search engine returns in the search results pages that skilled searchers visit.

18. A computer-implemented process for displaying advertisements to a searcher using a search engine, comprising:

identifying a search expertise level of the searcher based on a post-query browsing behavior of the searcher in relation to a search trail, the post-query browsing behavior defined as browsing behavior of the searcher after a query has been submitted to the search engine and the search results have been returned to the searcher and the search trail defined as a consecutive series of Web pages that lay on a hyperlink trail originating with a click on a search engine result and ending with the searcher performing an activity unrelated to a current search;

selling advertising space for pages of the search engine based on the search level expertise of the searcher to obtain expertise-specific advertisements;

determining whether an advertiser wants to pay more to advertise to a novice searcher, who are known to be more likely to click on advertisements overall, or to a skilled searcher; and displaying the expertise-specific advertisements to the searcher through the advertising space in a search engine user interface.

* * * * *